(12) United States Patent
Lee et al.

(10) Patent No.: US 9,623,745 B2
(45) Date of Patent: Apr. 18, 2017

(54) POWER TRANSMISSION SYSTEM OF HYBRID ELECTRIC VEHICLE

(71) Applicant: Hyundai Motor Company, Seoul (KR)

(72) Inventors: Changwook Lee, Suwon-si (KR);
Kangsoo Seo, Yongin-si (KR);
Donghwan Hwang, Seoul (KR);
Jaechang Kook, Hwaseong-si (KR);
Jongsool Park, Hwaseong-si (KR);
Horim Yang, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 64 days.

(21) Appl. No.: 14/559,871

(22) Filed: Dec. 3, 2014

(65) Prior Publication Data
US 2015/0369350 A1 Dec. 24, 2015

(30) Foreign Application Priority Data

Jun. 19, 2014 (KR) .................. 10-2014-0074901

(51) Int. Cl.
| | |
|---|---|
| *B60K 6/365* | (2007.10) |
| *F16H 3/72* | (2006.01) |
| *F16H 37/06* | (2006.01) |
| *B60K 6/547* | (2007.10) |
| *B60K 6/387* | (2007.10) |
| *B60K 6/445* | (2007.10) |

(52) U.S. Cl.
CPC .............. *B60K 6/547* (2013.01); *B60K 6/387* (2013.01); *B60K 6/445* (2013.01); *F16H 2200/2005* (2013.01); *Y02T 10/6239* (2013.01); *Y10S 903/919* (2013.01)

(58) Field of Classification Search
CPC .................. B60K 6/365; F16H 2200/0021
See application file for complete search history.

(56) References Cited

U.S. PATENT DOCUMENTS

| | | | | |
|---|---|---|---|---|
| 2009/0209381 | A1* | 8/2009 | Ai ................... | B60K 6/26 475/5 |
| 2010/0012407 | A1* | 1/2010 | Oba .................. | B60K 6/365 180/65.23 |
| 2010/0018789 | A1* | 1/2010 | Oba .................. | B60K 6/365 180/65.235 |

(Continued)

FOREIGN PATENT DOCUMENTS

KR 10-2014-0068678 A 6/2014

*Primary Examiner* — Tisha Lewis
(74) *Attorney, Agent, or Firm* — Morgan, Lewis & Bockius LLP

(57) ABSTRACT

A power transmission system of a hybrid electric vehicle may include an input shaft to which power from an engine is input, an output shaft, a planetary gear set including a first rotation element being driven by electrical driving force, a second rotation element being externally engaged with the output shaft as an output element, and a third rotation element being driven by rotational power of an engine, a first motor/generator directly connected to the first rotation element of the planetary gear set, a second motor/generator selectively externally engaged with the output shaft, a first transfer gear, a second transfer gear, a variable connecting unit selectively connecting the first transfer gear to the input shaft or the output shaft, and a variable direct coupling unit selectively connecting two rotation elements among the three rotation elements, of the planetary gear set.

18 Claims, 5 Drawing Sheets

(56) References Cited

U.S. PATENT DOCUMENTS

| | | | |
|---|---|---|---|
| 2013/0260936 A1* | 10/2013 | Takei | B60K 6/365 475/5 |
| 2014/0148290 A1* | 5/2014 | Lee | B60K 6/387 475/5 |
| 2014/0378258 A1* | 12/2014 | Kim | B60K 6/365 475/5 |
| 2015/0148172 A1* | 5/2015 | Puiu | B60K 6/365 475/5 |

* cited by examiner

FIG. 2

| MODE | GEAR SHIFT STAGE | FRICTION ELEMENT | | |
|---|---|---|---|---|
| | | C1 | C2 | C3 |
| EV | 1ST | ● | | |
| HEV | 1ST | ● | | |
| | 2ND | | ● | |
| ENGINE | 1ST | ● | ● | |
| | 2ND | | | ● |

POWER TRANSMISSION SYSTEM OF HYBRID ELECTRIC VEHICLE

CROSS-REFERENCE TO RELATED APPLICATION

The present application claims priority to Korean Patent Application No. 10-2014-0074901 filed Jun. 19, 2014, the entire contents of which is incorporated herein for all purposes by this reference.

BACKGROUND OF THE INVENTION

Field of the Invention

The present invention relates to a power transmission system of a hybrid electric vehicle and, more particularly, to a power transmission system of a hybrid electric vehicle which reduces an electrical load by increasing the portion of a mechanical power transfer path in splitting engine power to use a large amount of engine power, which replaces an engine mode when a vehicle starts to reduce the number of mode conversions, and which minimizes a change in RPM of every rotation element in mode conversion.

Description of Related Art

Eco-friendly technology of vehicles is a core technology reflecting the survival of automobile industry in the future, and advanced automobile manufacturers direct all their energy to development of eco-friendly vehicles to achieve environmental and fuel efficiency regulation.

Automobile manufacturers have developed an electric vehicle (EV), a hybrid electric vehicle (HEV), a fuel cell electric vehicle (FCEV), and the like, as future automobile technology.

There are limits and restrictions in technology such as weight, cost, and the like, on the future automobiles, and thus, automobile manufacturers have noted hybrid vehicles as alternatives for practical problems to meet the emission gas control and improve fuel efficiency and have fiercely competed to commercialize hybrid vehicles.

Hybrid vehicles use two or more power sources and may be combined in various ways. As power source, an existing gasoline engine or a diesel engine using fossil fuel and a motor/generator driven by electric energy are used together.

Hybrid vehicles use a motor/generator having relatively good low-speed torque characteristics as a primary power source at a low speed and an engine having relatively good high-speed torque characteristics as a primary power source at a high speed.

Thus, in a low-speed section, an operation of an engine using fossil fuel in hybrid vehicles is stopped and a motor/generator is used instead, improving fuel efficiency and reducing exhaust gas.

Power transmission systems of such hybrid vehicles are classified as a single mode type and a multi-mode type.

The mono-mode type power transmission system is advantageous in that it does not require a torque transmission mechanism such as a clutch or a brake, but efficiency is degraded when a vehicle runs at a high speed, having low fuel efficiency, and in order to be applied to a large vehicle, an additional torque amplifier is required.

The multi-mode type power transmission system has high efficiency when a vehicle runs at a high speed, and since it can be designed to amplify torque by itself, the multi-mode type power transmission system is applicable to medium and large-sized vehicles.

Thus, recently, the multi-mode type power transmission system, rather than the mono-mode power transmission system, is largely employed and research into the multi-mode type power transmission system is actively conducted.

The multi-mode type power transmission system includes a plurality of planetary gear sets, a plurality of motor/generators used as motors and generators, a plurality of torque transmission mechanisms (friction components) that control rotation elements of the planetary gear sets, a battery used as a power source of the motor/generators, and the like.

The multi-mode type power transmission system has different operational mechanisms according to connection configurations of the planetary gear sets, the motor/generators, and the torque transmission mechanisms.

Also, the multi-mode type power transmission systems have characteristics in that durability, power transmission efficiency, size, and the like, thereof are varied according to connection configurations, and thus, research and development continues to implement a firmer, compact power transmission system without power loss in the field of power transmission systems of hybrid electric vehicles.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a power transmission system of a hybrid electric vehicle having advantages of reducing an electrical load by increasing the portion of a mechanical power transfer path in splitting engine power to use a large amount of engine power, having advantages of replacing an engine mode when a vehicle starts to reduce the number of mode conversions, and having advantages of minimizing a change in RPM of every rotation element in mode conversion.

Additionally, various aspects of the present invention are directed to providing a power transmission system of a hybrid electric vehicle having advantages of providing an engine mode allowing a vehicle to run without an electrical load of a motor/generator to enhance fuel efficiency for running at a high speed.

According to various aspects of the present invention, a power transmission system of a hybrid electric vehicle may include an input shaft to which power from an engine is input, an output shaft spaced apart from the input shaft by a predetermined distance and disposed to be parallel with the input shaft, a planetary gear set including three rotation elements disposed on the input shaft, a first rotation element being driven by electrical driving force, a second rotation element being externally engaged with the output shaft as an output element, and a third rotation element being driven by rotational power of an engine, a first motor/generator disposed on the input shaft and directly connected to the first rotation element of the planetary gear set, a second motor/generator disposed on the input shaft and selectively externally engaged with the output shaft, a first transfer gear selectively connected to the input shaft and directly connected to the second motor/generator, a second transfer gear selectively connected to the input shaft and directly connected to the second rotation element, a variable connecting unit selectively connecting the first transfer gear to the input shaft or the output shaft, and a variable direct coupling unit selectively connecting two rotation elements among the three rotation elements, of the planetary gear set.

The planetary gear set may be a single pinion planetary gear set and may include a sun gear as the first rotation element, a planetary carrier as the second rotation element and a ring gear as the third rotation element.

The planetary gear set may be a double pinion planetary gear set and include a sun gear as the first rotation element, a ring gear as the second rotation element and a planetary carrier as the third rotation element.

The first transfer gear may have a gear ratio such that rotational power is transmitted to the output shaft, in a decelerated state, relative to the second transfer gear.

The variable connecting unit may include a first clutch disposed between the first transfer gear and the output shaft, and a second clutch disposed between the input shaft and the first transfer gear.

The variable direct coupling unit may be configured as a third clutch disposed between the input shaft and the second rotation element of the planetary gear set.

The variable direct coupling unit may be configured as a third clutch disposed between the first rotation element and the second rotation element of the planetary gear set.

The variable direct coupling unit may be configured as a third clutch disposed between the second rotation element and the third rotation element of the planetary gear set.

According to various aspects of the present invention, a power transmission system of a hybrid electric vehicle may include an input shaft to which power from an engine is input, an output shaft spaced apart from the input shaft by a predetermined distance and disposed to be parallel with the input shaft, a planetary gear set, as a single pinion planetary gear set, disposed on the input shaft and including a sun gear electrically driven by electrical driving force, a planetary carrier externally engaged with the output shaft as an output element, and a ring gear driven by rotational power of an engine, a first motor/generator disposed on the input shaft and directly connected to the planetary gear set, a second motor/generator disposed on the input shaft and selectively externally engaged with the output shaft, a first transfer gear selectively connected to the input shaft and directly connected to the second motor/generator, a second transfer gear selectively connected to the input shaft and directly connected to the planetary carrier, a variable connecting unit selectively connecting the first transfer gear to the input shaft or the output shaft, and a variable direct coupling unit selectively connecting two rotation elements among three rotation elements, of the planetary gear set.

The first transfer gear may have a gear ratio such that rotational power is transmitted to the output shaft, in a decelerated state, relative to the second transfer gear.

The variable connecting unit includes a first clutch disposed between the first transfer gear and the output shaft, and a second clutch disposed between the input shaft and the first transfer gear.

The variable direct coupling unit may be configured as a third clutch disposed between the input shaft and the planetary carrier of the planetary gear set.

The variable direct coupling unit may be configured as a third clutch disposed between the sun gear and the planetary carrier of the planetary gear set.

The variable direct coupling unit may be configured as a third clutch disposed between the planetary carrier and the ring gear of the planetary gear set.

According to various aspects of the present invention, a power transmission system of a hybrid electric vehicle may include an input shaft to which power from an engine is input, an output shaft spaced apart from the input shaft by a predetermined distance and disposed to be parallel with the input shaft, planetary gear sets, as double pinion planetary gear sets, disposed on the input shaft and including a sun gear electrically driven by electrical driving force, a ring gear externally engaged with the output shaft as an output element, and a planetary carrier driven by rotational power of an engine, a first motor/generator disposed on the input shaft and directly connected to the planetary gear set, a second motor/generator disposed on the input shaft and selectively externally engaged with the output shaft, a first transfer gear selectively connected to the input shaft and directly connected to the second motor/generator, a second transfer gear selectively connected to the input shaft and directly connected to the ring gear, a variable connecting unit selectively connecting the first transfer gear to the input shaft or the output shaft, and a variable direct coupling unit selectively connecting two rotation elements among three rotation elements, of the planetary gear set.

The first transfer gear may have a gear ratio such that rotational power is transmitted to the output shaft, in a decelerated state, relative to the second transfer gear.

The variable connecting unit may include a first clutch disposed between the first transfer gear and the output shaft, and a second clutch disposed between the input shaft and the first transfer gear.

The variable direct coupling unit may be configured as a third clutch disposed between the input shaft and the planetary carrier of the planetary gear set.

Referring to the first and second clutches forming the variable connecting unit and the third clutch forming the variable direct coupling unit, the first clutch may be operated in an EV mode 1ST, the first clutch may be operated in an HEV mode 1ST, the second clutch may be operated in an HEV mode 2ND, the first clutch and the second clutch may be operated in an engine mode 1ST, and the third clutch may be operated in an engine mode 2ND.

According to various embodiments of the present invention, in the overall configuration, two EV modes, two hybrid modes, and two engine modes can be implemented by combining one planetary gear set, three friction elements, and two motor/generators.

Also, in splitting engine power, by increasing a portion of the mechanical power transfer path, an electrical load can be reduced and maximum engine power can be used.

In addition, by transmitting great torque, relative to engine torque, to the output shaft, a portion of the mechanical power transfer path is increased, and greater engine power can be utilized for the same motor/generator specification.

Moreover, since greater acceleration can be obtained in the hybrid mode than in the engine mode, conversion into the engine mode is not required when a vehicle starts, simplifying the system.

Furthermore, the friction elements can be reduced in number according to a reduction in the modes, and thus, efficiency can be further enhanced.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a table of operations of friction elements applied to the exemplary power transmission system according to operation modes according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
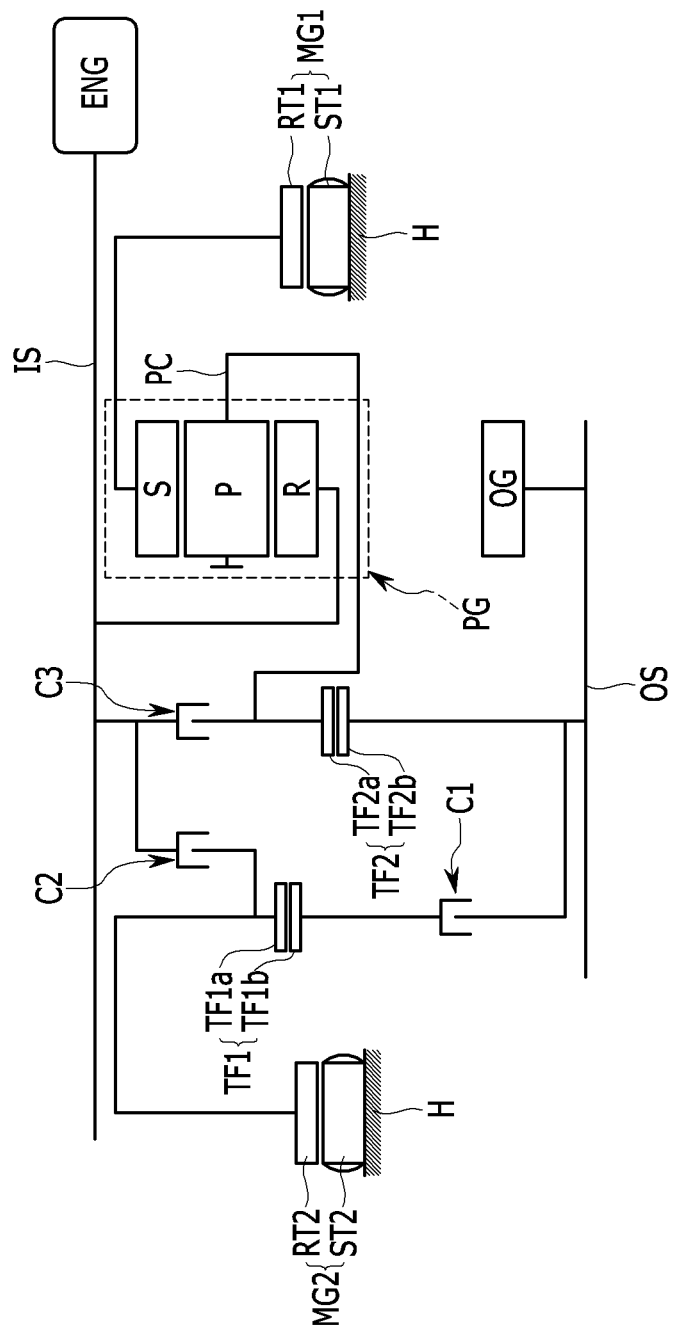
FIG. 1 is a view illustrating a configuration of an exemplary power transmission system according to the present invention.

FIG. 1 is a view illustrating a configuration of a power transmission system of a hybrid electric vehicle according to various embodiments of the present invention.

Referring to FIG. 1, a power transmission system according to various embodiments of the present invention changes rotational power of an engine ENG delivered through an input shaft IS according to running states of a vehicle and outputs the changed rotational power through an output gear OG.

The power transmission system includes the input shaft IS, the output shaft OS, a planetary gear set PG, first and second motor/generators MG1 and MG2, first and second transfer gears TF1 and TF2, and a variable direct coupling unit and variable connecting units configured as first, second, and third clutches CL1, CL2, and CL3.

The engine ENG is a primary power source, and various known engines such as an existing gasoline engine or diesel engine using fossil fuel may be used as the engine ENG.

The input shaft IS is an input member which delivers rotational power generated by the engine ENG to a transmission side. The input shaft IS may be connected to an output shaft of the engine ENG through a damper and a clutch or may be directly connected to the output shaft of the engine ENG without intervention of the damper and the clutch.

The output shaft OS is spaced apart from the input shaft IS by a predetermined distance and disposed to be parallel with the input shaft IS, receives rotational power from the input shaft IS and the planetary gear set PG through the two first and second transfer gears TF1 and TF2, and delivers the received rotational power to a differential through the output gear OG integrally formed with the output shaft OS.

The planetary gear set PG is configured as a simple planetary gear set such as a single pinion planetary gear set and a double pinion planetary gear set. In various embodiments of the present invention, a single pinion planetary gear set is illustrated as being employed.

The planetary gear set PG includes three rotation elements composed of a planetary carrier PC supporting a plurality of pinions P, a sun gear S externally engaged with the pinions P and a ring gear P internally engaged with the pinions P.

The first motor/generator MG1 and the second motor/generator MG2 are independently power sources, having motor and generator functions.

The first motor/generator MG1 includes a first stator ST1 fixed to a transmission housing H and a first rotor RT1 positioned within a radius portion of the first stator ST1.

The second motor/generator MG2 includes a second stator ST2 fixed to a transmission housing H and a second rotor RT2 positioned within a radius portion of the second stator ST2.

The first and second transfer gears TF1 and TF2 include first and second transfer driver gears TF1a and TF2a externally engaged with each other and first and second transfer driven gears TF1b and TF2b, respectively.

The first transfer gears TF1 have a gear ratio set to transmit rotational power to the output shaft OS, in a decelerated state, relative to the second transfer gear TF2.

The first, second, and third clutches C1, C2, and C3 are known friction elements selectively connecting a rotation element with another rotation element, which may be multi-plate hydraulic friction elements friction-coupled by hydraulic pressure.

The first and second clutches C1 and C2 are applied as variable connecting units to selectively transmit power, and the third clutch C3 is applied as a variable direct coupling unit to selectively connect two rotation elements selected from among the three rotation elements of the planetary gear set PG to put the planetary gear set PG in a selectively directly coupled state.

The power transmission system of a hybrid electric vehicle configured as described above according to various embodiments of the present invention will be described in detail as follows.

The planetary gear set PG and the first and second motor/generators MG1 and MG2 are disposed on the input shaft IS.

In the planetary gear set PG, the sun gear S, a first rotation element, is directly connected to the first rotor RT1 of the first motor/generator MG1 so as to be driven by electrical driving force, the planetary carrier PC, a second rotation element, is directly connected to the second transfer driver gear TF2a of the second transfer gear TF2 as an output element, and the ring gear R, a third rotation element, is directly connected to the input shaft IS to receive driving force from the engine ENG.

Accordingly, in a hybrid mode, driving force from the engine ENG and driving force from the first motor/generator MG1 are complemented so as to be output through the planetary carrier PC.

In the second motor/generator MG2, the second rotor RT2 is directly connected to the first transfer driver gear TF1a of the first transfer gear TF1, and thus, in an EV mode, driving force from the second motor/generator MG2 drives the first transfer driver gear TF1a.

The first transfer driven gear TF1b externally engaged with the first transfer driver gear TF1a is selectively connected to the output shaft OS, and the second transfer driver gear TF2a externally engaged with the second transfer driven gear TF2b is directly connected to the output shaft OS.

In the above, it is described that the first transfer driven gear TF1b is variably connected to the output shaft OS, but the present invention is not limited thereto and the first transfer driven gear TF1b may be selectively connected to the second transfer driven gear TF2b directly connected to the output shaft OS.

The first clutch C1 is disposed between the first transfer driven gear TF1b and the output shaft OS to selectively connect the second motor/generator MG2 and the output shaft OS, and the second clutch C2 is disposed between the input shaft IS and the first transfer driver gear TF1a to selectively connect rotational power of the input shaft IS and the first transfer driver gear TF1a, whereby the first clutch C1 and the second clutch C2 serve as variable connecting units.

The third clutch C3 is disposed between the input shaft IS and the planetary carrier PC to selectively connect the input shaft IS and the planetary carrier PC, whereby the third clutch C3 serves as a variable direct coupling unit putting the planetary gear set PG to a selectively directly coupled state.

Also, in the drawings, it is illustrated that the third clutch C3 is disposed between the input shaft IS and the planetary carrier PC, but it is equivalent to a case in which the third clutch C3 is disposed between the ring gear R directly connected to the input shaft IS and the planetary carrier PC.

FIG. 2 is a table of operations of friction elements applied to a planetary gear train according to operation modes according to various embodiments of the present invention.

Operational states of the friction elements according to operation modes will be described with reference to FIG. 2.

In an EV mode, in a first gear shift stage (EV mode 1ST), the first clutch is operated, in an HEV mode, in a first gear shift stage (HEV mode 1ST), the first clutch is operated, in the HEV mode, in a second gear shift stage (HEV mode 2ND), the second clutch is operated, in an engine mode, in a first gear shift stage (engine mode 1ST), the first clutch and the second clutch are operated, and in the engine mode, in a second gear shift stage (engine mode 2ND), the third clutch is operated, thus changing speeds.

In the power transmission system according to various embodiments, one EV mode, two hybrid operation modes, and two engine modes may be implemented.

Hereinafter, operational principles of the modes will be described.

[EV Mode 1st]

In the first gear shift stage of the EV mode, in a state in which an engine is stopped, power of a battery is supplied to a motor/generator to operate a vehicle with power of the motor/generator.

In the first gear shift stage of the EV mode, the engine is stopped, and thus, improvement of fuel efficiency is greatly affected and a vehicle can be reversed without a reversing device. This stage is applied when a vehicle in a stopped state is started and runs at a low speed, and in order to prevent the vehicle from being slipped in an uphill road or in order to quickly accelerate the vehicle, a deceleration gear ratio at which a power source rotates faster than the output shaft OS is required.

In this condition, in the first gear shift stage of the EV mode, the first clutch C1 is operated and driving force from the second motor/generator MG2 is transmitted to the output shaft OS, enabling the vehicle to run, and the vehicle runs forwards or backwards according to rotation directions of the second motor/generator MG2.

[HEV Mode 1st]

In the HEV mode, power of an engine is transmitted to the output shaft OS through a mechanical path and an electrical path, and the power distribution is performed by the planetary gear set, and since the engine and the motor/generator connected to the planetary gear set can arbitrarily adjust a rotation speed regardless of a vehicle speed, the planetary gear set serves as an electrically controlled continuously variable transmission (CVT).

Thus, compared with the existing transmission whose engine speed and torque are fixed with respect to a vehicle speed, the engine speed and torque of the electronically controlled CVT can be freely changed, maximizing operation efficiency of the engine and enhancing fuel efficiency.

In consideration of this, in the first gear shift stage of the EV mode, only the planetary carrier PC is restrained by the second transfer driver gear TF2a, while the sun gear S and the ring gear R rotate freely.

Thus, after the engine ENG is started by using the first motor/generator MG1, the speed of the engine ENG and the first motor/generator MG1 can be controlled regardless of a vehicle speed.

Here, torque of the first motor/generator MG1 is always in a clockwise direction, regardless of a rotation direction, and thus, the sum of torque of the engine ENG and that of the first motor/generator MG1 is transmitted to the output shaft OS, generating high driving force.

[HEV Mode 2nd]

In the first gear shift stage of the HEV mode, a rotation speed of the motor/generator connected to the output shaft OS is restrained by a vehicle speed, and thus, it is difficult to effectively operate the motor/generator and reduce capacity.

In particular, if a vehicle speed is so high that a rotation speed of the motor/generator restrained to the vehicle speed is high, efficiency of the motor/generator is degraded, and thus, optimal fuel efficiency cannot be implemented.

Thus, in order to release the second motor/generator MG2 from the vehicle speed, an operation of the first clutch C1 is released and the second clutch C2 is engaged and connected to the engine ENG.

Then, since only the planetary carrier PC of the planetary gear set PG is connected to the output shaft OS, the engine ENG and the first motor/generator MG1 and the second motor/generator MG2 can freely change an operating point with respect to a vehicle speed, while maintaining a constant speed and a torque relationship.

[Engine Mode 1st]

A core technology for improving fuel efficiency of a hybrid vehicle may be regenerating braking energy and freely controlling an engine operating point.

Controlling an engine operating point includes two energy conversion processes; a process of converting mechanical energy of an engine into electrical energy in a motor/ generator and a process of converting electrical energy of the motor/generator into mechanical energy in the motor/generator.

In such energy conversion, energy is not entirely output but loss is made midway, and in a certain operation condition, fuel efficiency may be better in an engine mode in which a vehicle is driven by only engine than in a hybrid operation mode Namely, in the engine mode 1ST, when the first clutch C1 and the second clutch C2 are engaged, rotational power of the engine ENG is transmitted to the output shaft OS through the first transfer gear TF1.

Here, since power of the first motor/generator MG1 and the second motor/generator MG2 is not required, the vehicle is driven by only the driving force of the engine ENG, and since the planetary gear set PG is excluded from a power transfer path, high transmission efficiency can be obtained.

[Engine Mode 2nd]

In the engine mode 2ND, operations of the first and second clutches C1 and C2 are released and an operation of the third clutch C3 is controlled.

Then, the planetary gear set PG is put to a direct coupling state and integrally rotated, and rotational power of the engine ENG is transmitted to the output shaft through the second transfer gear TF2, and here, a gear ratio equal to that of the second transfer gear TF2 is established.

As described above, according to various embodiment of the present invention, in the overall configuration, one EV mode, two hybrid modes, and two engine modes can be implemented by combining one planetary gear set PG, three friction elements C1, C2, and C3, and two motor/generators MG1 and MG2.

Also, in splitting engine power, by increasing a portion of the mechanical power transfer path, an electrical load can be reduced and maximum engine power can be used.

In addition, by transmitting great torque, relative to engine torque, to the output shaft, a portion of the mechanical power transfer path is increased, and greater engine power can be utilized for the same motor/generator specification.

Moreover, since greater acceleration can be obtained in the hybrid mode than in the engine mode, conversion into the engine mode is not required when a vehicle starts, simplifying the system.

Furthermore, the friction elements can be reduced in number according to a reduction in the H mode, and thus, efficiency can be further enhanced.

Figure 3:
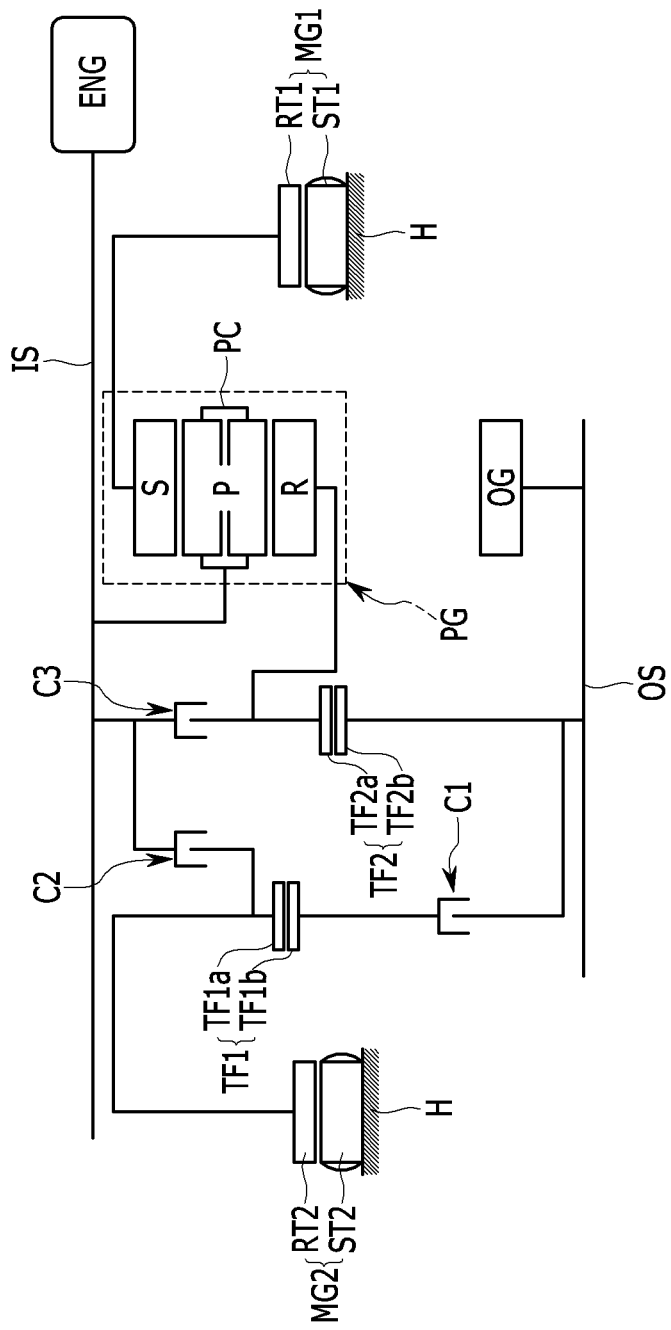
FIG. 3 is a view illustrating a configuration of an exemplary power transmission system according to the present invention.

FIG. 3 is a view illustrating a configuration of a power transmission system according to various embodiments of the present invention.

Referring to FIG. 3, in previously described embodiments, the planetary gear set PG is configured as a single pinion planetary gear set, but in various embodiments described in FIG. 3, double pinion planetary gear sets are configured.

The various embodiments of FIG. 3 are the same operational effect as that of the previously described embodiments, except for the configuration in which the ring gear R is directly connected as a second rotation element to the second transfer gear TF2 and the planetary carrier PC is directly connected as a third rotation element to the input shaft IS, and thus, a detailed description thereof will be omitted.

Figure 4:
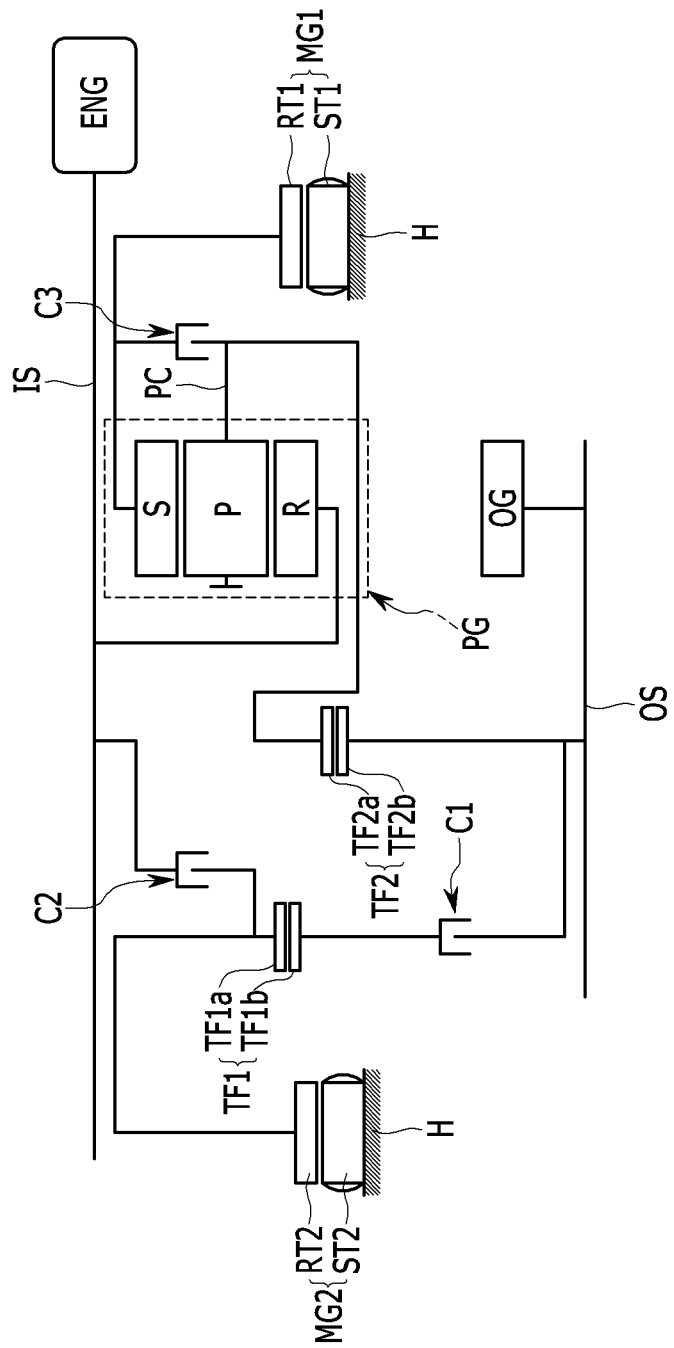
FIG. 4 is a view illustrating a configuration of an exemplary power transmission system according to the present invention.

FIG. 4 is a view illustrating a configuration of a power transmission system according to various embodiments of the present invention.

Referring to FIG. 4, compared with the previously described embodiments in which the third clutch C3 is disposed between the input shaft IS and the planetary carrier PC, in the various embodiments described in FIG. 4, the third clutch C3 is disposed between the sun gear S and the planetary carrier PC.

Thus, the operational effect of the various embodiments described in FIG. 4 is the same as that of the previously described embodiments, except for the position of the third clutch C3, and thus, a detailed description thereof will be omitted.

Figure 5:
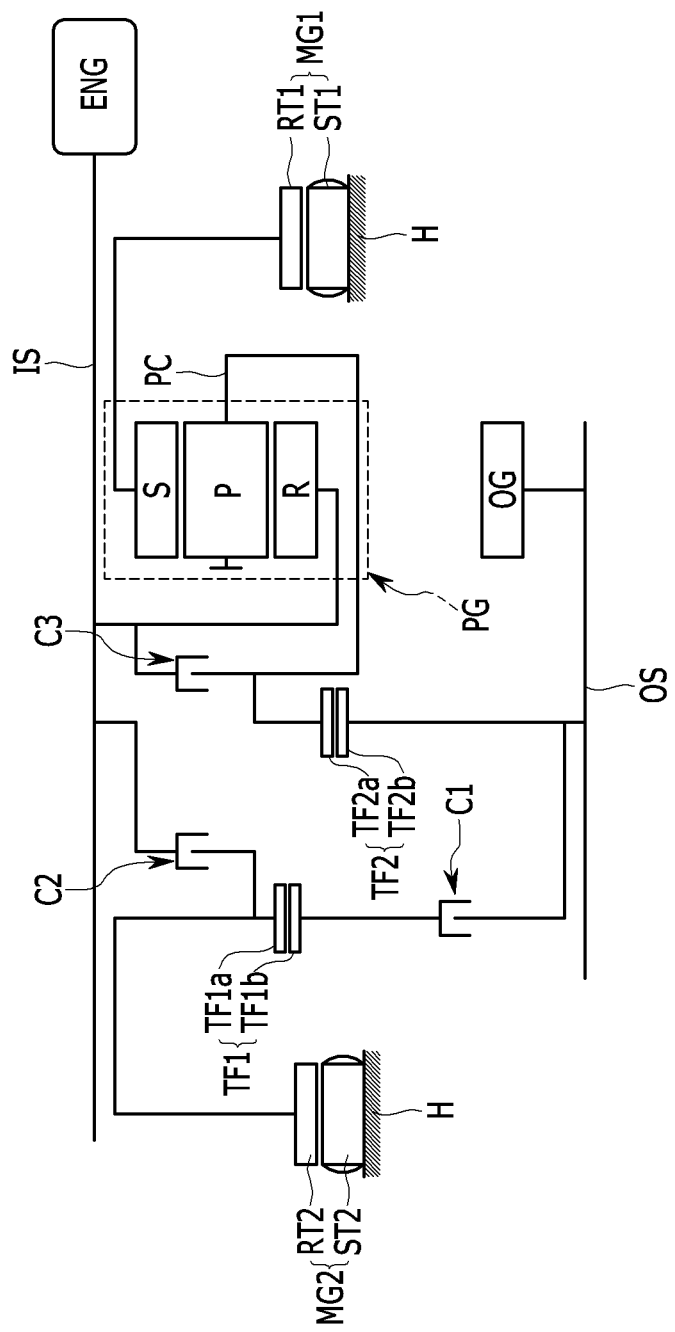
FIG. 5 is a view illustrating a configuration of an exemplary power transmission system according to the present invention.

FIG. 5 is a view illustrating a configuration of a power transmission system according to various embodiments of the present invention.

Referring to FIG. 5, compared with the previously described embodiments in which the third clutch C3 is disposed between the input shaft IS and the planetary carrier PC, in the various embodiments described in FIG. 5, the third clutch C3 is disposed between the planetary carrier PC and the ring gear R.

Thus, the operational effect of the various embodiments described in FIG. 5 is the same as that of the previously described embodiments, except for the position of the third clutch C3, and thus, a detailed description thereof will be omitted.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power transmission system of a hybrid electric vehicle, the power transmission system comprising:
    an input shaft to which power from an engine is input;
    an output shaft spaced apart from the input shaft by a predetermined distance and disposed to be parallel with the input shaft;
    a planetary gear set including three rotation elements disposed on the input shaft, a first rotation element being driven by electrical driving force, a second rotation element being engaged with the output shaft as an output element, and a third rotation element being driven by rotational power of an engine;
    a first motor/generator disposed on the input shaft and directly connected to the first rotation element of the planetary gear set;
    a second motor/generator disposed on the input shaft and selectively engaged with the output shaft;
    a first transfer gear selectively connected to the input shaft and directly connected to the second motor/generator;
    a second transfer gear selectively connected to the input shaft and directly connected to the second rotation element;
    a variable connecting apparatus selectively connecting the first transfer gear to the input shaft or the output shaft; and a variable direct coupling apparatus selectively connecting two rotation elements among the three rotation elements, of the planetary gear set.

2. The power transmission system of claim 1, wherein the planetary gear set is a single pinion planetary gear set and includes a sun gear as the first rotation element, a planetary carrier as the second rotation element and a ring gear as the third rotation element.

3. The power transmission system of claim 1, wherein the planetary gear set is a double pinion planetary gear set and includes a sun gear as the first rotation element, a ring gear as the second rotation element and a planetary carrier as the third rotation element.

4. The power transmission system of claim 1, wherein the first transfer gear has a gear ratio such that rotational power is transmitted to the output shaft, in a decelerated state, relative to the second transfer gear.

5. The power transmission system of claim 1, wherein the variable connecting apparatus includes:
a first clutch disposed between the first transfer gear and the output shaft; and
a second clutch disposed between the input shaft and the first transfer gear.

6. The power transmission system of claim 1, wherein the variable direct coupling apparatus is configured as a third clutch disposed between the input shaft and the second rotation element of the planetary gear set.

7. The power transmission system of claim 1, wherein the variable direct coupling apparatus is configured as a third clutch disposed between the first rotation element and the second rotation element of the planetary gear set.

8. The power transmission system of claim 1, wherein the variable direct coupling apparatus is configured as a third clutch disposed between the second rotation element and the third rotation element of the planetary gear set.

9. A power transmission system of a hybrid electric vehicle, the power transmission system comprising:
an input shaft to which power from an engine is input;
an output shaft spaced apart from the input shaft by a predetermined distance and disposed to be parallel with the input shaft;
a planetary gear set, as a single pinion planetary gear set, disposed on the input shaft and including three rotation elements having a sun gear electrically driven by electrical driving force, a planetary carrier engaged with the output shaft as an output element, and a ring gear driven by rotational power of an engine;
a first motor/generator disposed on the input shaft and directly connected to the planetary gear set;
a second motor/generator disposed on the input shaft and selectively engaged with the output shaft;
a first transfer gear selectively connected to the input shaft and directly connected to the second motor/generator;
a second transfer gear selectively connected to the input shaft and directly connected to the planetary carrier;
a variable connecting apparatus selectively connecting the first transfer gear to the input shaft or the output shaft; and
a variable direct coupling apparatus selectively connecting two rotation elements among the three rotation elements, of the planetary gear set.

10. The power transmission system of claim 9, wherein:
the first transfer gear has a gear ratio such that rotational power is transmitted to the output shaft, in a decelerated state, relative to the second transfer gear.

11. The power transmission system of claim 9, wherein the variable connecting apparatus includes:
a first clutch disposed between the first transfer gear and the output shaft; and
a second clutch disposed between the input shaft and the first transfer gear.

12. The power transmission system of claim 9, wherein the variable direct coupling apparatus is configured as a third clutch disposed between the input shaft and the planetary carrier of the planetary gear set.

13. The power transmission system of claim 9, wherein the variable direct coupling apparatus is configured as a third clutch disposed between the sun gear and the planetary carrier of the planetary gear set.

14. The power transmission system of claim 9, wherein the variable direct coupling apparatus is configured as a third clutch disposed between the planetary carrier and the ring gear of the planetary gear set.

15. A power transmission system of a hybrid electric vehicle, the power transmission system comprising:
an input shaft to which power from an engine is input;
an output shaft spaced apart from the input shaft by a predetermined distance and disposed to be parallel with the input shaft;
planetary gear sets, as double pinion planetary gear sets, disposed on the input shaft and including three rotation elements having a sun gear electrically driven by electrical driving force, a ring gear engaged with the output shaft as an output element, and a planetary carrier driven by rotational power of an engine;
a first motor/generator disposed on the input shaft and directly connected to the planetary gear set;
a second motor/generator disposed on the input shaft and selectively engaged with the output shaft;
a first transfer gear selectively connected to the input shaft and directly connected to the second motor/generator;
a second transfer gear selectively connected to the input shaft and directly connected to the ring gear;
a variable connecting apparatus selectively connecting the first transfer gear to the input shaft or the output shaft; and
a variable direct coupling apparatus selectively connecting two rotation elements among the three rotation elements, of the planetary gear set.

16. The power transmission system of claim 15, wherein the first transfer gear has a gear ratio such that rotational power is transmitted to the output shaft, in a decelerated state, relative to the second transfer gear.

17. The power transmission system of claim 15, wherein the variable connecting apparatus includes:
a first clutch disposed between the first transfer gear and the output shaft; and
a second clutch disposed between the input shaft and the first transfer gear.

18. The power transmission system of claim 15, wherein the variable direct coupling apparatus is configured as a third clutch disposed between the input shaft and the planetary carrier of the planetary gear set.

* * * * *